US009811059B2

(12) United States Patent
Bermudez et al.

(10) Patent No.: US 9,811,059 B2
(45) Date of Patent: **\*Nov. 7, 2017**

(54) WIRELESS NETWORK OF LOW POWER SENSING AND ACTUATING MOTES

(71) Applicant: International Business Machines Corporation, Armonk, NY (US)

(72) Inventors: Sergio A. Bermudez, Hudson, NY (US); Hendrik F. Hamann, Yorktown Heights, NY (US); Levente I. Klein, Tuckahoe, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 14 days.

This patent is subject to a terminal disclaimer.

(21) Appl. No.: 13/965,382

(22) Filed: Aug. 13, 2013

(65) Prior Publication Data

US 2014/0257699 A1 Sep. 11, 2014

Related U.S. Application Data

(63) Continuation of application No. 13/790,006, filed on Mar. 8, 2013.

(51) Int. Cl.
*G01W 1/00* (2006.01)
*G05B 15/02* (2006.01)
(Continued)

(52) U.S. Cl.
CPC ............... *G05B 15/02* (2013.01); *G01W 1/02* (2013.01); *G06F 15/00* (2013.01); *H04L 67/10* (2013.01);
(Continued)

(58) Field of Classification Search
USPC ............................................................ 702/3
See application file for complete search history.

(56) References Cited

U.S. PATENT DOCUMENTS 7,286,835 B1 10/2007 Dietrich et al.
7,701,858 B2 4/2010 Werb et al.
(Continued)

OTHER PUBLICATIONS

Chen et al., "A High-Fidelity Temperature Distribution Forecasting System for Data Centers," The 33rd IEEE Real-Time Systems Symposium (RTSS 2012), Dec. 4-7, 2012, San Juan, Puerto Rico, 10 pages, downloaded Oct. 16, 2012 from http://aims.cse.msu.edu/~tanrui/pub/datacenter-rtss.pdf.
(Continued)

*Primary Examiner* — Paul D Lee
(74) *Attorney, Agent, or Firm* — Cantor, Colburn LLP; Vazken Alexanian

(57) ABSTRACT

Embodiments include a wireless mote network having a plurality of motes, wherein each of the plurality of motes includes a processing unit in communication with a communications device. Each of the motes includes at least a sensor configured to monitor an environmental condition in an area around the mote or an actuator configured to control one or more external systems. The wireless mote network also includes a central communications device configured to communicate with one or more of the motes within a range of the central communications device and a controller configured to communicate with the central communications device, to receive one or more signals indicative of the environmental condition of one or more of the plurality of motes, and to transmit one or more control signals indicating an operation of the actuator to one or more of the plurality of motes.

7 Claims, 5 Drawing Sheets

(51) Int. Cl.

| | | |
|---|---|---|
| *G06F 15/00* | (2006.01) | |
| *G01W 1/02* | (2006.01) | |
| *H04L 29/06* | (2006.01) | |
| *H04W 4/00* | (2009.01) | |
| *H04W 4/04* | (2009.01) | |
| *H04W 84/18* | (2009.01) | |
| *H04L 29/08* | (2006.01) | |
| *H04W 8/00* | (2009.01) | |
| *H04W 24/00* | (2009.01) | |
| *H04W 24/04* | (2009.01) | |

(52) U.S. Cl.
CPC .......... *H04L 67/125* (2013.01); *H04L 67/42* (2013.01); *H04W 4/006* (2013.01); *H04W 4/043* (2013.01); *G01W 1/00* (2013.01); *H04L 67/12* (2013.01); *H04W 8/005* (2013.01); *H04W 24/00* (2013.01); *H04W 24/04* (2013.01); *H04W 84/18* (2013.01); *Y02B 60/50* (2013.01)

(56) References Cited

U.S. PATENT DOCUMENTS

| | | | |
|---|---|---|---|
| 7,894,944 B2 | 2/2011 | Liu et al. | |
| 7,933,739 B2 | 4/2011 | Brey et al. | |
| 7,941,096 B2* | 5/2011 | Perkins | G06F 19/327 340/539.13 |
| 2005/0208952 A1 | 9/2005 | Dietrich et al. | |
| 2005/0246334 A1 | 11/2005 | Tao et al. | |
| 2006/0172782 A1* | 8/2006 | Planning | H01M 10/465 455/572 |
| 2007/0043478 A1* | 2/2007 | Ehlers et al. | 700/276 |
| 2007/0060098 A1* | 3/2007 | McCoy | G01S 5/0289 455/404.2 |
| 2008/0056722 A1* | 3/2008 | Hendrix | G08C 23/04 398/108 |
| 2008/0164997 A1 | 7/2008 | Aritsuka et al. | |
| 2008/0212699 A1 | 9/2008 | Imaeda et al. | |
| 2009/0168747 A1 | 7/2009 | Kimura | |
| 2010/0187832 A1* | 7/2010 | Holland et al. | 290/1 A |
| 2011/0064026 A1* | 3/2011 | Niedermeier | G01D 21/00 370/328 |
| 2012/0021768 A1 | 1/2012 | Rudland et al. | |
| 2012/0109404 A1 | 5/2012 | Pandey et al. | |

OTHER PUBLICATIONS

Hamann et al., "Recovery Act: A Measurement-Management Technology for Improving Energy Efficiency in Data Centers and Telecommunication Facilities," Final Technical Report, Award No. DE-EE0002897; Jun. 28, 2012; 27 pages.

Herman et al., "Wireless Applications for Hospital Epidemiology," Proceedings of the 1st ACM International Workshop on Medical-grade Wireless Networks, 2009, pp. 45-50.

Lee et al., "MotesArt: Wireless Sensor Network for Monitoring Relative Humidity and Temperature in an Art Gallery," IEEE International Conference on Networking, Sensing and Control, 2008. ICNSC 2008, pp. 1263-1268.

Liu et al., "Project Genome: Wireless Sensor Network for Data Center Cooling," The Architecture Journal, Microsoft, vol. 18; Dec. 2008; pp. 28-34.

Peralta et al., "Enabling Museum's Environmental Monitorization Based on Low-Cost WSN's," 10th International Annual Conference on New Technologies of Distributed Systems (NOTERE), 2010, pp. 227-234.

* cited by examiner

WIRELESS NETWORK OF LOW POWER SENSING AND ACTUATING MOTES

This application is a continuation application of the legally related U.S. Ser. No. 13/790,006, filed Mar. 8, 2013, the contents of which are incorporated by reference herein in their entirety.

BACKGROUND

Exemplary embodiments relate to wireless sensing and actuation networks, and more specifically, to methods and systems for providing a network of low power sensing and actuating motes.

In general, motes are small low-power computers that are configured to act as sensors. Currently available motes are configured to communicate with a central computer via a radio link. Common radio links allow a mote to transmit a distance of approximately 10 to 200 feet. The distance is typically limited by power consumption, size and cost constraints. Mote networks are currently used for a variety of applications and the motes may include Global Positioning System (GPS) sensors for use in identifying the location of each mote in the mote network.

SUMMARY

According to an exemplary embodiment, a wireless mote network having a plurality of motes, wherein each of the plurality of motes includes a processing unit in communication with a communications device. Each of the motes includes at least a sensor configured to monitor an environmental condition in an area around the mote or an actuator configured to control one or more external systems. The wireless mote network also includes a central communications device configured to communicate with one or more of the motes within a range of the central communications device and a controller configured to communicate with the central communications device, to receive one or more signals indicative of the environmental condition of one or more of the plurality of motes, and to transmit one or more control signals indicating an operation of the actuator to one or more of the plurality of motes.

According to an exemplary embodiment, a method for indoor localization of a wireless mote network having a plurality of motes is provided. The method includes instructing each of the plurality of motes to sequentially emit a signal and recording by each of the plurality of motes data corresponding to each of the signals observed the mote. The method also includes transmitting the recorded data to a server and generating, by the server, a map of the relative location of the plurality of motes and taking global or local action based on the sensor data.

According to a further exemplary embodiment, a computer program product for indoor localization of a wireless mote network having a plurality of motes is provided. The computer program product comprises a computer readable storage medium having computer readable program code embodied therewith. The computer readable program code is configured for instructing each of the plurality of motes to sequentially emit a signal and recording by each of the plurality of motes data corresponding to each of the signals observed the mote. The method also includes transmitting the recorded data to a server and generating, by the server, a map of the relative location of the plurality of motes and taking global or local action based on the sensor data.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

DETAILED DESCRIPTION

Exemplary embodiments of this disclosure include low-power mote networks, wherein the motes may include a variety of sensors, actuators, power supplies, and processors configured to provide various functionalities. The mote networks may be integrated with existing measurement and management technologies to enhance analytics and information processing capabilities. In exemplary embodiments, the mote network can be used to facilitate data acquisition, processing, and information visualization across a distributed physical environment.

Figure 1:
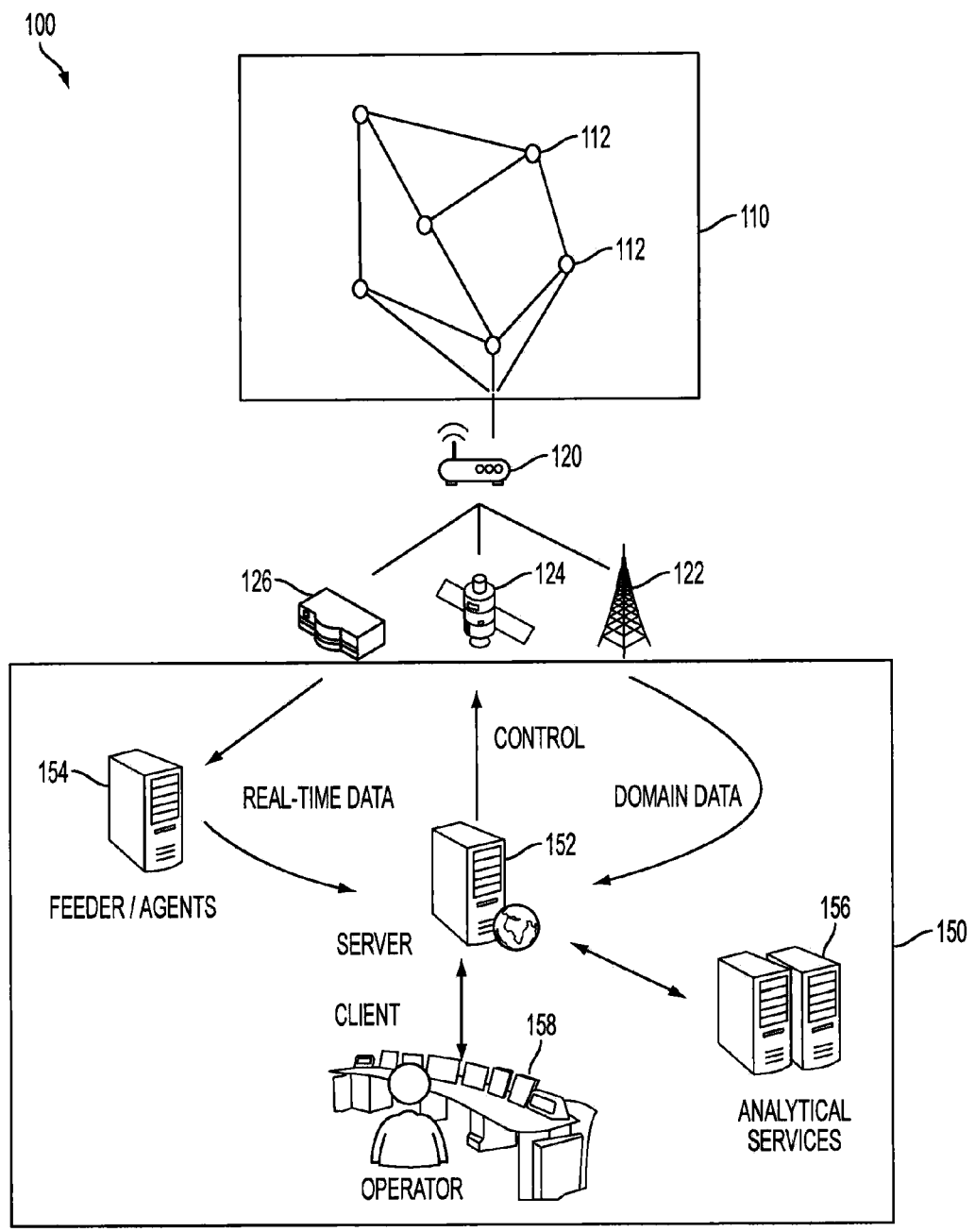
FIG. 1 is a schematic diagram of a system including a mote network and a controller according to an exemplary embodiment.

Referring now to FIG. 1, a system 100 including a mote network 110 and a controller 150 according to an exemplary embodiment is shown. As illustrated, the mote network 110 includes a plurality of motes 112 which are each configured to wirelessly communicate with one or more nearby motes 112. In exemplary embodiments, the motes 112 may be able to communicate with any other motes 112 within a range of 100 feet. The system also includes a central communications device 120 that is configured to communicate with one or more motes 112 within communication range. In exemplary embodiments, the central communications device 120 may be able to communicate with any motes 112 within a range of 100 feet. The central communications device 120 is also configured to communicate with one or more additional communications systems which may include, but are not limited to, a cellular communications system 122, a satellite communications system 124, or a network communications system 126.

Continuing with reference to FIG. 1, the system 100 also includes a controller 150 which is configured to communicate with mote network 110 via the central communications device 120. In exemplary embodiments, the controller 150 may include a server 152, analytical services 156, feeders 154 and a client device 158. In one embodiment, the feeders 154 are configured to receive data from the mote network 110 and provide the data to the server 152. The feeders 154 may be configured to filter and/or consolidate data received from the motes 112 prior to providing the data to the server 152 or may be configured to provide the raw data to the server 152. In exemplary embodiments, the server 152 may utilize the analytical services 156 to analyze the data received from the feeders 154. The client device 158, which may be a general use computer or other suitable computing device, is configured to communicate with the server 152 and allow a user to access the data received from the motes 112 and to control the operation of the motes 112. In exemplary embodiments, the server 152 is configured to provide control commands to the motes 112 via the central communications device 120.

In exemplary embodiments, the motes 112 of the mote network 110 are configure to perform indoor localization by combining different localization techniques. These localization techniques may include, but are not limited to, time of flight, received signal strength indicator, and a time synchronization protocol. In exemplary embodiments, based on the device characteristics of the motes 112, it is possible for mote network 110 to provide indoor device localization with accuracy of two to three feet. In exemplary embodiments, the server 152 is configured to receive location information from each of the motes 112 and to construct a map illustrating the relative locations of the motes 112. The ability to perform indoor localization is particularly useful in applications that require tracking of people or assets within an indoor space, where other localization systems, such as GPS, do not work.

Figure 2:
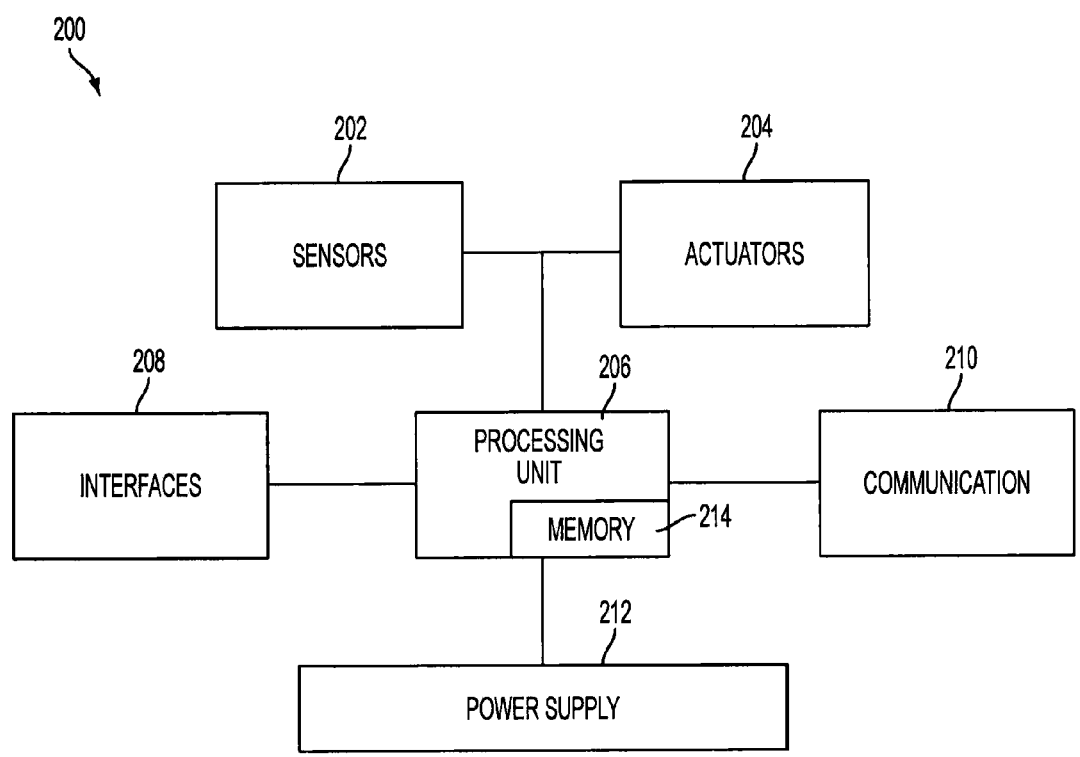
FIG. 2 is a block diagram of a mote according to an exemplary embodiment.

Referring now to FIG. 2 a block diagram of a mote 200 according to an exemplary embodiment is shown. As illustrated, the mote 200 may include sensors 202, actuators 204, interfaces 208, communications devices 210, a power supply 212 and a processing unit 206. In exemplary embodiments, the sensors 202 may be configured to monitor one or more of the following: temperature, humidity, pressure, air flow, $CO_2$ levels, CO levels, presence, noise, corrosion, stress, strain, acceleration, or the like. In exemplary embodiments, the sensors 202 may include transducers that monitor environmental conditions like humidity and temperature and may generate a command that would enable a limitation of the environmental changes due to external factors (using air for cooling, limiting human presence, etc. . . . ). In addition, other sensors 202 can be used to monitor logistics variables like the location or presence of a person or asset.

In exemplary embodiments, the mote 200 may include a wide variety of actuators 204. The actuators 204 may be configured to control a relay that can be connected to an external system, such as a lighting control system, an air conditioning system, or the like. In exemplary embodiments, the actuators 204 may be latching relays used for simple on-off type of control, while interfaces 208, such as a serial communication interfaces, can be used for more sophisticated control interfaces with other devices or systems. In exemplary embodiments, the mote 200 may include one or more interfaces 208 to enable the mote 202 to electrically communicate with almost any kind of other device. The interfaces 208 may include, but are not limited to, I2C, SPI, analog I/O, digital I/O, and serial communication RS-232.

In exemplary embodiments, the mote 200 includes a processing unit 206 such as a microcontroller. In exemplary embodiments, the microcontrollers of the motes 200 can have different embedded algorithms and the processing units 206 of each mote 200 can carry out different processing tasks. Accordingly, each mote 200 may have processing units 206 with different processing architectures that can be selected based on the requirements of the application performed by the mote 200. In exemplary embodiments, the mote 200 can support data logging by storing raw or processed data in an on-board memory 214 when required or when wireless network connectivity is not available. The mote is capable of doing self-diagnostic, for example after power-up or power interruption, or self-test and verify its integrity (assets or sensors attached to it or defined in its configuration memory). The mote is also capable of generating alarms in case of self-test failure.

In exemplary embodiments, the motes 200 include a communications device 210 that can be used for all the communication and wireless networking done by the mote 200. The communications device 210 may be a low-power radio that allows the mote 200 to be powered by batteries and have a relatively long lifetime. In exemplary embodiments, to reduce the power consumption of the mote 200, the communications protocol utilized by the communications device 210 may be based on a time synchronized wireless access.

In exemplary embodiments, the motes 200 include a power supply 212. The power supply 212 may include batteries, a line power adapter, and/or an energy harvesting device. Energy harvesting devices may include solar panel capable of being powered by indoor lighting (or energy harvesting by vibration or radio frequency signals). In exemplary embodiments, the modularity of the motes 200 allows the motes 200 to have different kinds of power supplies 212 in order to be able to adapt to the requirements of the various applications.

Figure 3:
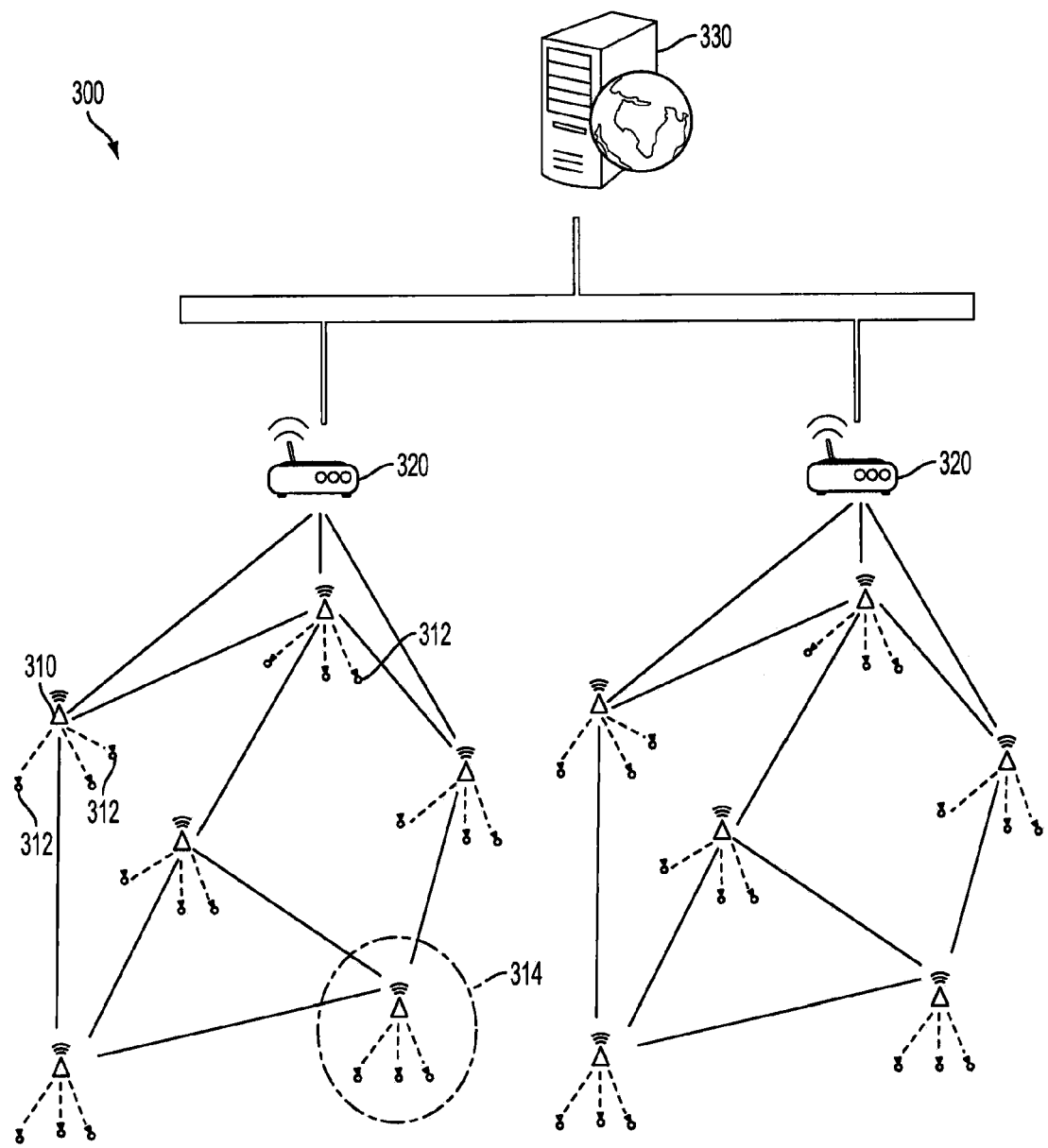
FIG. 3 is a schematic diagram of a wireless sensor network according to an exemplary embodiment.

Referring now to FIG. 3, a wireless sensor network 300 according to an exemplary embodiment is shown. As illustrated, the wireless sensor network 300 includes a plurality of motes 310 that are each configured to communicate with other motes 310 or a central communications device 320 within a predetermined range of the mote. In one embodiment, the predetermined range may be approximately 100 feet. In exemplary embodiments, the motes 310 may include a RFID reader configured to sense the presence of one or more RFID tags 312 within proximity 314 of the mote 310. The RFID reader may be a passive or active reader depending upon the application. In exemplary embodiments, the motes 310 are configured to sense the presence of RFID tags 312 within proximity 314 and to send data regarding the detected RFID tags 312 to a controller 330 via a central communications device 320.

In exemplary embodiments, the mote network may be configured for use in a wide variety of applications. In one embodiment, a mote sensing network can be configured to be used for asset tracking and management. For example, motes can be attached to a server rack and include an RFID reader that can be used to track servers having RFID tags that are placed in the server rack. The tracking of assets in data centers facilitates the location of assets on demand in the space (data center floor, storage room, surrounding office space). In addition, the motes can be configured to detect specific events, such as the movement of an asset (entering or exiting the data center, installing or removing an asset from a rack or re-locating it within a rack). The motes may also actuate door opening based on the sensed signal; block the door if the person is not authorized to remove the equipment, generate an audible warning or notify the appropriate personnel.

In another embodiment, a mote network may be configured to improve the preservation of art by monitoring, modeling and managing micro-climatic conditions in the proximity of the art. For example, the mote network may be configured to provide real-time regarding the atmospheric conditions near the art to a server. The server can use that data and operational models which leverage physical analytics to derive micro-climatic conditions in a museum. Such models can supply temperature variations maps, for example, to guide conservators for optimal placement of works of art within the museum space. Sensors attached to the object of art monitoring its state (like a strain sensor attached across one crack of a wood panel that would increase its size due to increased temperature and humidity level generated by human presence) may control the number of people allowed in the exhibition room to maintain a safe condition for the object or art.

Figure 4:
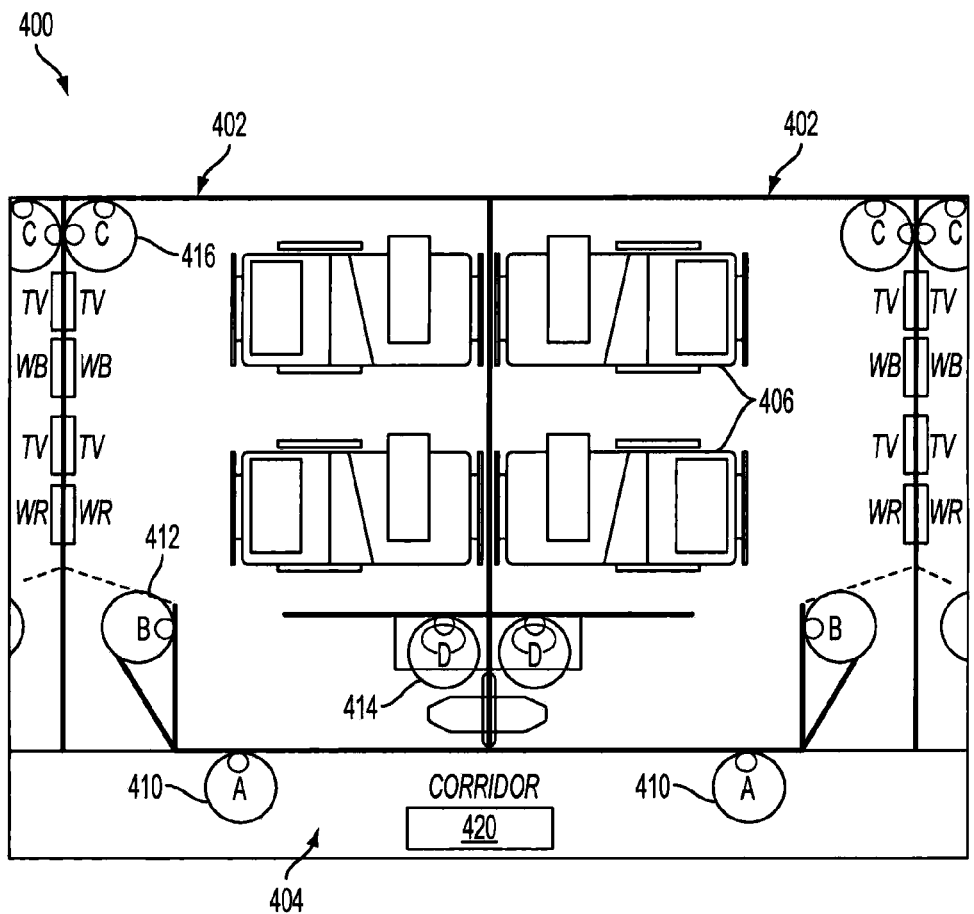
FIG. 4 is a schematic diagram of a wireless sensor network in a hospital according to an exemplary embodiment.

In yet another embodiment, a mote network may be configured to be used in a hospital to monitor hand-washing compliance by staff. FIG. 4 is an illustration of a section of the floor plan of a hospital 400 showing two rooms 402 and a corridor 404. In exemplary embodiments, the hospital 400 can include a mote in each hand sanitizer, for example in FIG. 4 a first mote 410 disposed in the corridor 404, a second mote 414 disposed near a sink in each room 402, a third mote 412 disposed near the entrance to each room 402 and a fourth mote 416 disposed near the outdoor-facing wall in each room 402. The first mote 410 may include an RFID reader that is configured to monitor the movement of people and assets, such as capital equipment, through the hospital. The third mote 412 may also include an RFID reader that is configured to identify people entering a room 402. The second mote 414 and the fourth mote 416 are configured to monitor the use of hand washing/sanitizing stations (all motes monitor the usage of the sanitizers and the people who used them, if they are carrying an RFID badge). In exemplary embodiments, the hospital 400 may include a communications device 420 that is configured to communicate with each of the motes (via multihop communication, i.e. not directly from 420 to each mote) and with a hospital server (not shown). The communications device 420 collects the data received from each of the motes and provides that data to the hospital server which can analyze the data to monitor the hospital staff's compliance with hand-washing protocols. In case of multiple noncompliance events, a visual or an audio warning may be activated to highlight the risk of noncompliance on the patients. Additionally the patients may be also warned about the noncompliance.

In exemplary embodiments, the motes may also be used to track the location of supply or capital equipment in the hospital for loss prevention measures. Many of the supply are stored in supply room but is common that healthcare providers will store them locally in various rooms. In case a supply run out in the stockroom, the RFID tagged boxes can be localized in the hospital and provide information to personnel about location and quantity.

Figure 5:
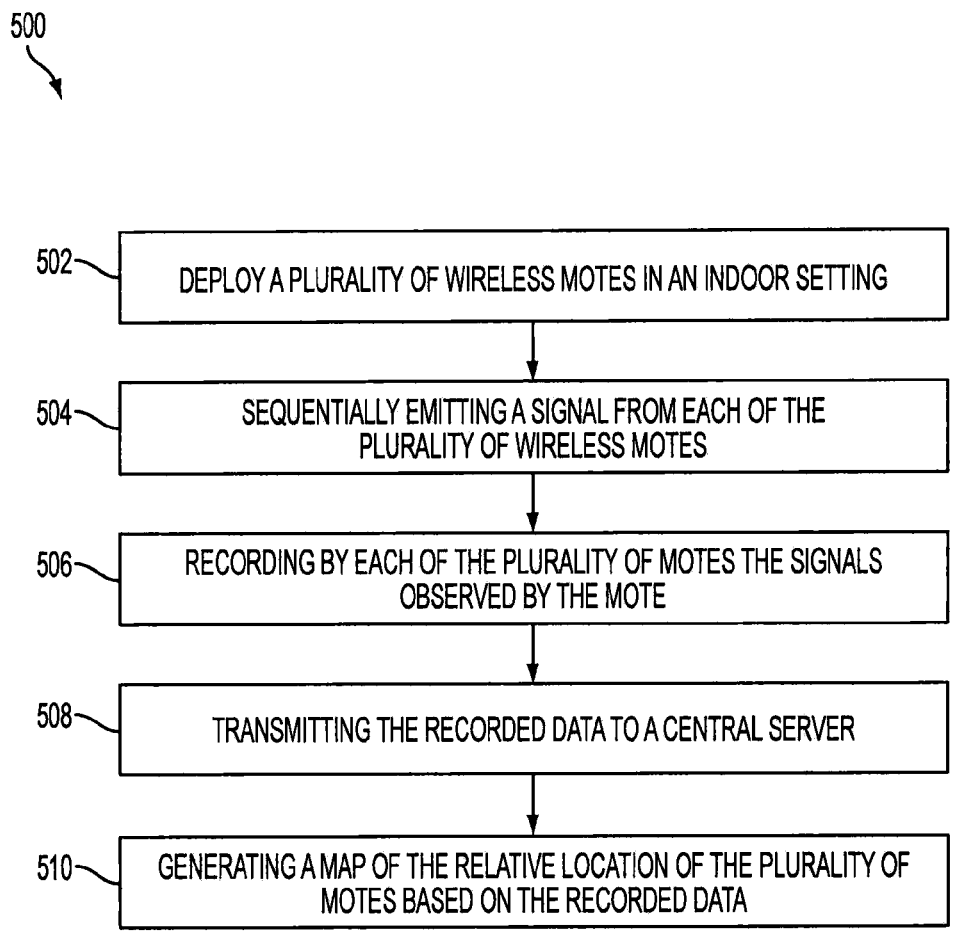
FIG. 5 is a flowchart diagram illustrating a method for performing indoor localization of a wireless sensor network in accordance with an exemplary embodiment.

Referring now to FIG. 5, a flowchart diagram illustrating a method 500 for performing indoor localization of a wireless sensor network in accordance with an exemplary embodiment is shown. The method 500 includes deploying a plurality of wireless motes, each mote having a synchronous clock, in an indoor setting, as illustrated at block 502. In exemplary embodiments, one or more of the plurality of wireless motes may be an anchor mote, which is a mote that has a known location. As illustrated at block 504, the method 500 includes sequentially emitting a signal from each of the plurality of wireless motes. In exemplary embodiments, the emitted signal may include an identification number for the mote emitting the signal and a time stamp indicating the time the signal was sent. As illustrated at block 506, the method 500 includes recording by each of the plurality of motes the signals observed by the mote. The motes transmit the recorded data to a central server, as shown at block 508. In exemplary embodiments, the motes may communicate with the central server through a central communications device. In addition, the motes may communicate with the central communications device through one or more motes in a multi-hop network using a time synchronization protocol. As illustrated at block 510, the method 500 includes generating a map of the relative location of the plurality of motes based on the recorded data. In exemplary embodiments, the central server may generate the map based on the known location of one or more anchor motes and one or more localization techniques such as time of flight or received signal strength indicator. In exemplary embodiments, based on the device characteristics of the motes, it is possible for map illustrating the relative location of the motes in the mote network to have an accuracy of two to three feet.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" or other high level programming language or other similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A wireless mote network comprising:
a plurality of motes, wherein each of the plurality of motes includes:
a processing unit in communication with a communications device, wherein the communications device is configured to emit an identification signal that includes an identification number of the mote and a time stamp indicating the time the signal was sent in response to the mote receiving an inquiry signal;
a sensor configured to monitor an environmental condition in an area around the mote;
an RFID reader configured to sense a presence of one or more RFID tags and to transmit data regarding the one or more RFID tags wherein the one or more RFID tags are each associated with capital equipment that is monitored by the wireless mote network; and
an actuator configured to control one or more external systems;
a central communications device configured to communicate directly with a first subset of the plurality of motes within a range of the central communications device and to communicate indirectly with a second subset of the plurality of motes not within the range of the communications device via multihop communications through the first subset of the plurality of the motes; and
a controller configured to communicate with the central communications device, via at least one of cellular communications system and a satellite communications system, to receive one or more signals indicative of the environmental condition of one or more of the plurality of motes, and to transmit one or more control signals indicating an operation of the actuator to one or more of the plurality of motes, wherein a position of at least one of the plurality of motes is unknown and wherein the controller includes a server configured to generate a map of a relative location of the plurality of motes based on a signal strength of a wireless communication between the plurality of motes,
wherein each of the plurality of motes records data corresponding to each of the identification signals observed by the mote, wherein the data corresponding to each of the signals observed by the mote comprises the identification number of the mote that emitted the signal, the time that the signal was emitted, the identification number of the mote that observed the signal and the time that the signal was observed.

2. The wireless mote network of claim 1, wherein one or more of the plurality of motes further includes an interface configured to enable the mote to electrically communicate with an external device.

3. The wireless mote network of claim 2, wherein the interface includes at least one of an RS-233 serial communication interface, an Ethernet interface, or an USB interface.

4. The wireless mote network of claim 1, wherein the environmental condition of the mote comprises at least one of the following: temperature; humidity; pressure; air flow; $CO_2$ level; CO level; presence; noise; strain; stress; and corrosion.

5. The wireless mote network of claim 1, wherein the external system is a lighting control system or an air conditioning system and the actuator is a latching relay used for simple on-off type of control.

6. A wireless mote network comprising:
   a plurality of motes, wherein each of the plurality of motes includes:
      a processing unit in communication with a communications device, wherein the communications device is configured to emit an identification signal that includes an identification number of the mote and a time stamp indicating the time the signal was sent in response to the mote receiving an inquiry signal;
      a sensor configured to monitor an environmental condition in an area around the mote;
      an RFID reader configured to sense a presence of one or more RFID tags and to transmit data regarding the one or more RFID tags wherein the one or more RFID tags are each associated with capital equipment that is monitored by the wireless mote network; and
      an actuator configured to control one or more external systems;
   a central communications device configured to communicate directly with a first subset of the plurality of motes within a range of the central communications device and to communicate indirectly with a second subset of the plurality of motes not within the range of the communications device via multihop communications through the first subset of the plurality of the motes; and
   a controller configured to communicate with the central communications device, via at least one of cellular communications system and a satellite communications system, to receive one or more signals indicative of the environmental condition of one or more of the plurality of motes, and to transmit one or more control signals indicating an operation of the actuator to one or more of the plurality of motes, wherein a position of at least one of the plurality of motes is unknown and wherein the controller includes a server configured to generate a map of a relative location of the plurality of motes based on a signal strength of a wireless communication between the plurality of motes,
   wherein each of the plurality of motes further includes two power supplies comprising at least two of a battery, a line power adapter, and an energy harvesting device and
   wherein each of the plurality of motes records data corresponding to each of the identification signals observed by the mote, wherein the data corresponding to each of the signals observed by the mote comprises the identification number of the mote that emitted the signal, the time that the signal was emitted, the identification number of the mote that observed the signal and the time that the signal was observed.

7. The wireless mote network of claim 6, wherein the energy harvesting device is a solar panel capable of being powered by indoor lighting.

* * * * *